(12) United States Patent
Seo (10) Patent No.: US 12,422,892 B2
(45) Date of Patent: Sep. 23, 2025

(54) ROLLABLE DISPLAY DEVICE FOR VEHICLE

(71) Applicant: HYUNDAI MOBIS CO., LTD., Seoul (KR)

(72) Inventor: Jun Seong Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 726 days.

(21) Appl. No.: 17/804,831

(22) Filed: May 31, 2022

(65) Prior Publication Data
US 2023/0030142 A1    Feb. 2, 2023

(30) Foreign Application Priority Data

Jul. 27, 2021 (KR) .................. 10-2021-0098831

(51) Int. Cl.
| | | |
|---|---|---|
| G06F 1/16 | (2006.01) | |
| B60K 35/10 | (2024.01) | |
| B60K 35/22 | (2024.01) | |
| B60K 35/55 | (2024.01) | |
| G09F 9/30 | (2006.01) | |

(52) U.S. Cl.
CPC ............ G06F 1/1652 (2013.01); B60K 35/10 (2024.01); B60K 35/223 (2024.01); B60K 35/55 (2024.01); G09F 9/301 (2013.01)

(58) Field of Classification Search
CPC ......... G06F 1/1652; G06F 1/16; B60K 35/00; B60K 35/223; B60K 35/55; B60K 2360/1523; B60K 2360/688; B60K 2360/691; B60K 35/22; B60K 2360/1438; B60K 35/10; G09F 9/301
See application file for complete search history.

(56) References Cited

U.S. PATENT DOCUMENTS

| | | | | |
|---|---|---|---|---|
| 10,111,344 | B2 * | 10/2018 | Han | H05K 5/03 |
| 10,319,263 | B2 * | 6/2019 | Lee | G09F 9/301 |
| 10,410,549 | B1 * | 9/2019 | Kim | G09F 9/301 |
| 10,506,726 | B2 * | 12/2019 | Kang | H10K 50/84 |
| 10,534,402 | B1 * | 1/2020 | Kim | G06F 1/1652 |

(Continued)

FOREIGN PATENT DOCUMENTS

| | | |
|---|---|---|
| DE | 10 2019 206935 | 11/2020 |
| EP | 3 107 082 | 12/2016 |

(Continued)

OTHER PUBLICATIONS

English Language Abstract of DE 10 2019 206935 published Nov. 19, 2020.

*Primary Examiner* — Rockshana D Chowdhury
(74) *Attorney, Agent, or Firm* — DLA PIPER LLP US (57) ABSTRACT

A rollable display device for a vehicle may include: a housing forming a body of the rollable display device, and having a housing space formed therein; a roller part rotatably housed in the housing space; and a display panel wound around the roller part or unwound from the roller part, according to the rotation direction of the roller part. The display panel may include: a screen part configured to receive an output signal from the outside, and output various pieces of information; and a support part disposed on a rear surface of the screen part, and configured to support the screen part in a horizontal direction and a vertical direction.

14 Claims, 5 Drawing Sheets

(56) References Cited

U.S. PATENT DOCUMENTS

| | | | | |
|---|---|---|---|---|
| 10,671,124 B2* | 6/2020 | Kim | ............... | G09F 9/301 |
| 10,684,714 B2* | 6/2020 | Seo | ............... | G06F 1/1624 |
| 10,783,809 B2* | 9/2020 | Kim | ............... | G09F 9/301 |
| 11,127,323 B2* | 9/2021 | Kim | ............... | G06F 1/1652 |
| 11,140,790 B2* | 10/2021 | Kim | ............... | H04B 1/3877 |
| 11,170,671 B1* | 11/2021 | Han | ............... | G09F 9/301 |
| 11,229,128 B2* | 1/2022 | Kim | ............... | G09F 9/301 |
| 11,272,626 B2* | 3/2022 | Lee | ............... | G06F 1/1601 |
| 11,452,218 B2* | 9/2022 | Choi | ............... | B32B 27/08 |
| 11,521,521 B2* | 12/2022 | Chung | ............... | G09F 11/21 |
| 11,558,969 B2* | 1/2023 | Kim | ............... | G09F 9/301 |
| 11,576,270 B2* | 2/2023 | Rha | ............... | G09F 27/005 |
| 11,687,119 B2* | 6/2023 | Chu | ............... | G06F 1/1656 361/679.01 |
| 11,842,659 B2* | 12/2023 | Khachatryan | ............... | G06F 1/1652 |
| 11,864,333 B2* | 1/2024 | Dong | ............... | G06F 1/1652 |
| 11,864,334 B2* | 1/2024 | Lee | ............... | G06F 1/1601 |
| 11,868,181 B2* | 1/2024 | Dong | ............... | G06F 1/1652 |
| 11,997,804 B2* | 5/2024 | Kim | ............... | G06F 1/1624 |
| 12,004,312 B2* | 6/2024 | Yoo | ............... | H05K 5/0017 |
| 12,045,092 B2* | 7/2024 | Luo | ............... | G06F 1/1681 |
| 12,045,093 B2* | 7/2024 | Chu | ............... | G06F 1/1679 |
| 12,130,667 B2* | 10/2024 | Guo | ............... | G06F 1/1652 |
| 12,174,666 B2* | 12/2024 | Ahn | ............... | G06F 1/1656 |
| 12,200,882 B2* | 1/2025 | Lee | ............... | H05K 5/0217 |
| 12,207,423 B2* | 1/2025 | Lee | ............... | G06F 1/1637 |
| 2011/0011542 A1* | 1/2011 | Kuroi | ............... | G03B 21/58 160/133 |
| 2016/0120022 A1* | 4/2016 | Lee | ............... | H04M 1/0268 361/749 |
| 2016/0155965 A1* | 6/2016 | Kusuura | ............... | H10K 71/50 29/829 |
| 2016/0161983 A1* | 6/2016 | Lee | ............... | G06F 1/1652 361/749 |
| 2016/0202729 A1* | 7/2016 | Lee | ............... | G06F 1/1652 361/749 |
| 2017/0013726 A1* | 1/2017 | Han | ............... | H05K 7/1427 |
| 2017/0156219 A1* | 6/2017 | Heo | ............... | G02F 1/133305 |
| 2017/0156225 A1* | 6/2017 | Heo | ............... | G09F 9/301 |
| 2018/0070466 A1* | 3/2018 | Kim | ............... | H04N 5/655 |
| 2018/0098440 A1* | 4/2018 | Choi | ............... | G06F 1/1624 |
| 2018/0110137 A1* | 4/2018 | Kim | ............... | H10K 50/8426 |
| 2018/0160554 A1* | 6/2018 | Kang | ............... | G09F 9/301 |
| 2019/0141843 A1* | 5/2019 | Park | ............... | H10K 50/841 |
| 2019/0204874 A1* | 7/2019 | Kim | ............... | G09F 9/301 |
| 2020/0394942 A1* | 12/2020 | Kim | ............... | G06F 1/1652 |
| 2021/0110792 A1* | 4/2021 | Hong | ............... | G09G 5/373 |
| 2021/0272486 A1* | 9/2021 | Khachatryan | ............... | G09F 9/301 |
| 2021/0327311 A1* | 10/2021 | Han | ............... | G06F 1/1601 |
| 2021/0337683 A1* | 10/2021 | Han | ............... | G09F 9/301 |
| 2022/0068170 A1* | 3/2022 | Han | ............... | G06F 1/1652 |
| 2022/0377918 A1* | 11/2022 | Dong | ............... | H05K 5/0018 |
| 2023/0004189 A1* | 1/2023 | Luo | ............... | G06F 1/1652 |
| 2023/0030142 A1* | 2/2023 | Seo | ............... | G09F 9/301 |
| 2023/0044285 A1* | 2/2023 | Jin | ............... | G06F 1/1652 |
| 2023/0180404 A1* | 6/2023 | Choi | ............... | G09F 9/301 361/807 |

FOREIGN PATENT DOCUMENTS

| | | |
|---|---|---|
| EP | 3 611 714 | 12/2020 |
| KR | 2017-0014055 | 2/2017 |
| KR | 2020-0034277 | 3/2020 |

* cited by examiner

ROLLABLE DISPLAY DEVICE FOR VEHICLE

CROSS-REFERENCE TO RELATED APPLICATION

This application claims priority to and the benefit of Korean Patent Application No. 10-2021-0098831, filed on Jul. 27, 2021, the disclosure of which is incorporated herein by reference in its entirety.

BACKGROUND

Technical Field

The present disclosure relates to a rollable display device, and more particularly, to a rollable display device for a vehicle.

Related Art

Recently, a flexible display has been commercialized. The flexible display reproduces an input image on the screen of a display panel having a plastic OLED (Organic Light Emitting Diode) formed therein.

The plastic OLED is formed on a flexible plastic substrate, can be designed in various manners, and have an advantage in terms of portability and durability.

The flexible display may be implemented as various types of displays such as a bendable display, foldable display, and rollable display.

Such a flexible display may be applied to not only a mobile device such as a smart phone or tablet PC, but also a TV, vehicle display, wearable device or the like, and the application field thereof is being expanded.

In order to apply a rollable display device among the various types of flexible displays to an AV system for a vehicle, various attempts are being actively made.

When the structure of such a rollable display is applied to an AV system for a vehicle, the rollable display may be easily broken by not only vibration generated during driving of the vehicle, but also a pressing force formed by a passenger's manipulation on a screen part composed of a touch panel while the passenger simply watches the display of the AV system for a vehicle.

For the above-described reasons, manufacturers in the corresponding field have sought for a method capable of raising the stiffness of the rollable display device for a vehicle. Up to now, however, the manufacturers have not obtained satisfactory results.

SUMMARY

Various embodiments are directed to a rollable display for a vehicle, which can raise the stiffness of a rollable display device.

The above-described purpose, other purposes, the advantages, and characteristics of the present disclosure and a method for achieving the purposes, advantages and characteristics will be clearly understood through embodiments to be described below in detail together with the accompanying drawings.

In an embodiment, a rollable display device for a vehicle may include: a housing forming a body of the rollable display device, and having a housing space formed therein; a roller part rotatably housed in the housing space; and a display panel wound around the roller part or unwound from the roller part, according to the rotation direction of the roller part. The display panel may include: a screen part configured to receive an output signal from the outside, and output various pieces of information; and a support part disposed on a rear surface of the screen part, and configured to support the screen part in a horizontal direction and a vertical direction.

The roller part may include: a display roller disposed in a lower region of the housing space, and configured to wind or unwind the screen part and a horizontal support of the support part according to the rotation direction thereof; and a support roller disposed in the lower region of the housing space, spaced by a predetermined distance apart from the display roller, and configured to wind or unwind a vertical support of the support part according to the rotation direction thereof.

The display roller and the support roller may be rotated in the opposite directions to each other.

The display roller and the support roller may be spaced by the thickness of the display panel apart from each other.

The display roller may have an outer diameter smaller than that of the support roller.

The support roller may include: a body part forming a body of the support roller; and a plurality of protrusion parts formed along the circumference of the body part, and spaced by a predetermined distance apart from each other in a longitudinal direction of the body part.

The width of each of the protrusion parts in the longitudinal direction of the body part may be smaller than the distance between the pair of protrusion parts adjacent to each other.

In another embodiment, a rollable display device for a vehicle may include: a housing forming a body of the rollable display device, and having a housing space formed therein; a roller part rotatably housed in the housing space; a display panel including a screen part configured to receive an output signal from the outside and output various pieces of information, and a support part disposed on a rear surface of the screen part, and configured to support the screen part in a horizontal direction and a vertical direction, wherein the display panel is wound around the roller part or unwound from the roller part according to the rotation direction of the roller part; and a driving part configured to rotate the roller part. The roller part may include: a display roller disposed in a lower region of the housing space, and configured to wind or unwind the screen part and a plurality of horizontal supports of the support part according to the rotation direction thereof; and a support roller disposed in the lower region of the housing space, spaced by a predetermined distance apart from the display roller, and configured to wind or unwind a vertical support of the support part according to the rotation direction thereof.

The support part may include: the plurality of horizontal supports disposed on a rear surface of the screen part and spaced by a predetermined distance apart from each other in a top-to-bottom direction; and the vertical support disposed on a rear surface of the horizontal support.

When the display panel is unrolled from the housing, the horizontal support and the vertical support may come into surface contact with each other.

The horizontal support may have a length smaller than or equal to the width of the screen part.

The vertical support may include: a plate-shaped support body part disposed on the rear surface of the horizontal support; a plurality of wing parts cut from the support body part so as to be elastically bent from the support body part;

and an inclined part formed at each of one end and the other end of each of the wing parts.

The wing part may be bent from the support body part toward the support roller.

The wing part may be inclined toward a cut groove formed by cutting the wing part from the support body part, when seen from the top.

The plurality of wing parts arranged on the left side of a middle region of the support body part and the plurality of wing parts arranged on the right side of the middle region of the support body part are inclined in directions facing each other.

In the rollable display device for a vehicle in accordance with the present disclosure, the plurality of support parts may be coupled to the rear surface of the screen part so as to be spaced by the predetermined distance apart from each other in the upward and downward directions. Thus, when a driver or passenger touches the screen part with the screen part unwound from the display roller so as to appear from the housing space of the housing, the support parts may effectively prevent a portion of the entire region of the screen part, which is touched by the driver or passenger's finger, from being depressed.

Furthermore, the wing parts may support the screen part in the vertical direction. Thus, when the driver or passenger touches the screen part with the screen part unwound from the display roller so as to appear from the housing space of the housing, the wing parts may prevent the screen part from being pushed in the direction that the driver or passenger presses the screen part with his/her finger.

Furthermore, the wing parts may effectively prevent the screen part from being bent by vibration generated during driving of the vehicle due to the characteristics of the use environment.

Furthermore, as the wing part is wound while the support roller presses the wing part along the inclined part, the wing part may be well spread on the support roller.

DETAILED DESCRIPTION

Embodiments of the present disclosure are provided to more completely describe the present disclosure to those skilled in the art. The following embodiments may be modified into various other forms, and the scope of the present disclosure is not limited to the following embodiments. Rather, the embodiments are provided to more reliably and completely describe the present disclosure, and to completely transfer the scope of the present disclosure to those skilled in the art. In the drawings, components are exaggerated for convenience and clarity of description, and like reference numerals represent the same elements. In this specification, the term "and/or" includes any one of corresponding listed items and one or more combinations thereof.

The terms used in this specification are used to describe a specific embodiment, and do not limit the present disclosure.

In this specification, the terms of a singular form may include plural forms unless referred to the contrary in the context. Furthermore, in this specification, the terms "comprise" and/or "comprising" specifies the presence of a shape, number, step, operation, member, element, and/or a group thereof, and do not exclude the presence or addition of one or more other shapes, numbers, steps, operations, members, elements, and groups thereof.

Hereafter, preferred embodiments of the present disclosure will be described in detail with reference to the accompanying drawings.

Figure 1:
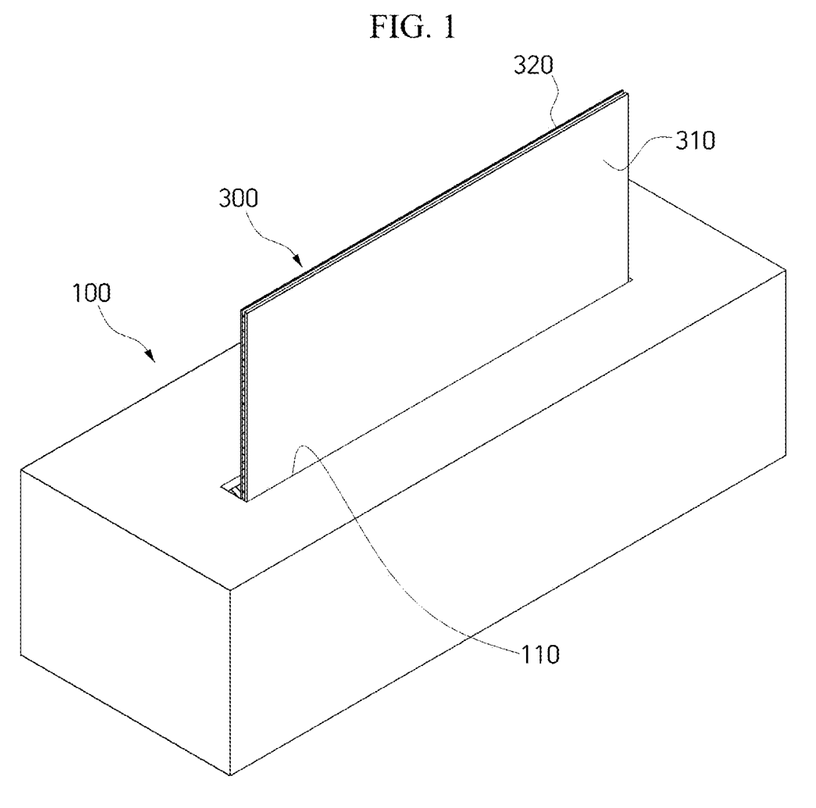
FIG. 1 is a perspective view illustrating a rollable display device for a vehicle in accordance with an embodiment of the present disclosure, when seen from one direction.
Figure 2:
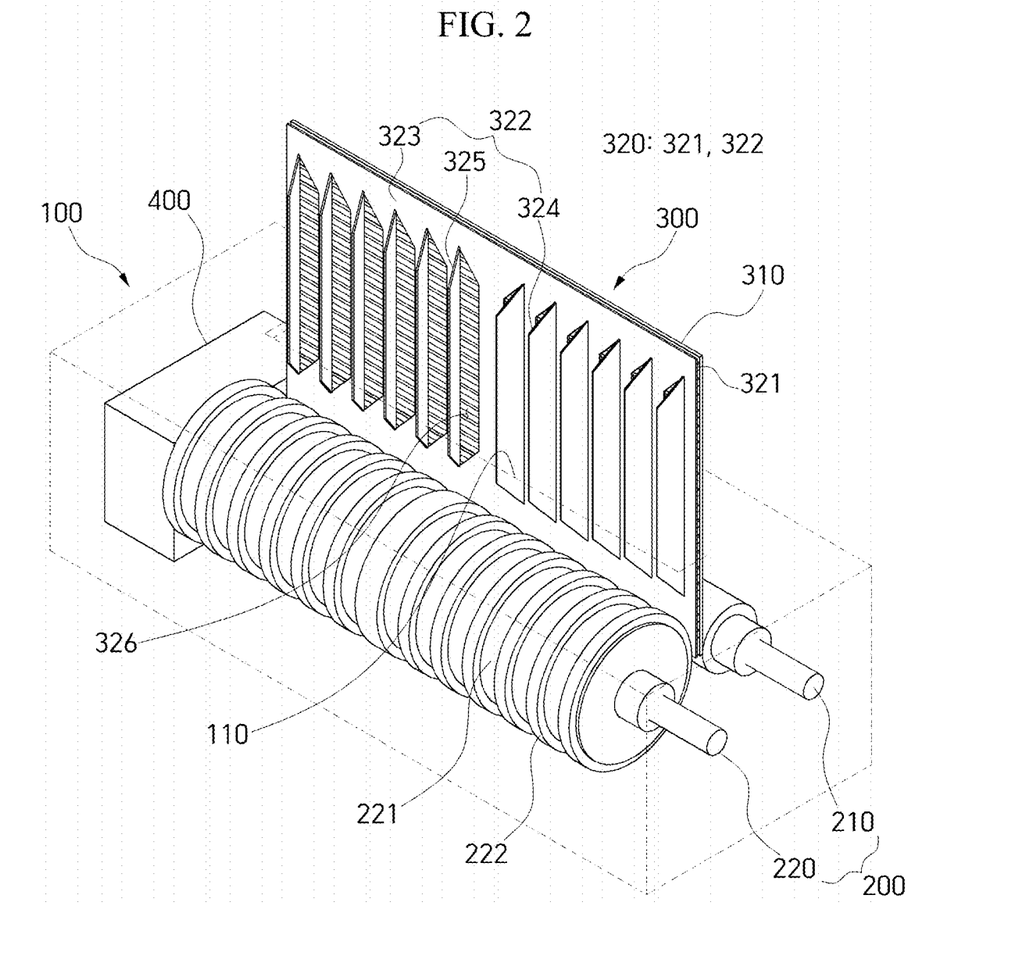
FIG. 2 is a perspective view illustrating the rollable display device for a vehicle in accordance with the embodiment of the present disclosure, when seen from another direction.
Figure 3:
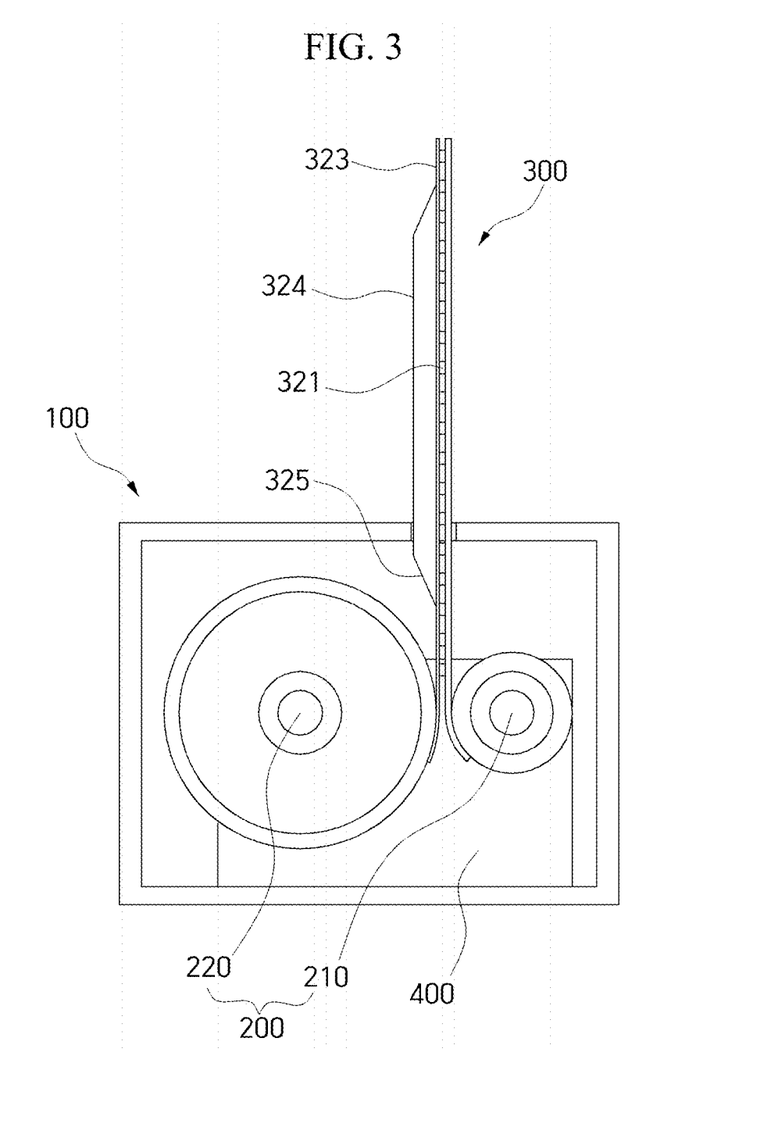
FIG. 3 is a cross-sectional view taken along line A-A' of FIG. 1.
Figure 4:
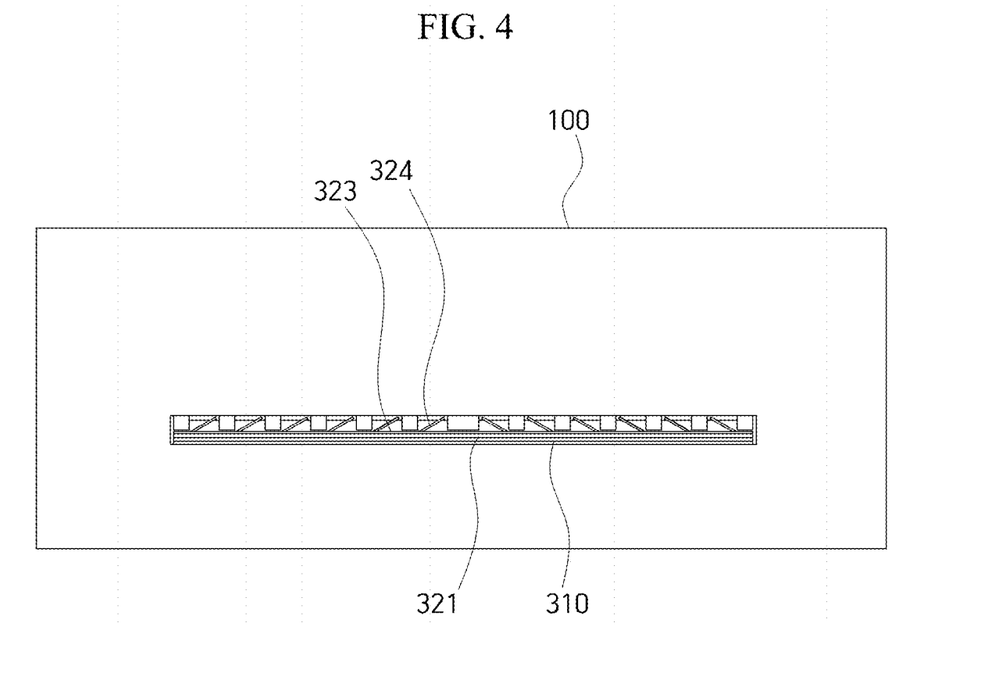
FIG. 4 is a plan view illustrating the rollable display device for a vehicle in accordance with the embodiment of the present disclosure.
Figure 5:
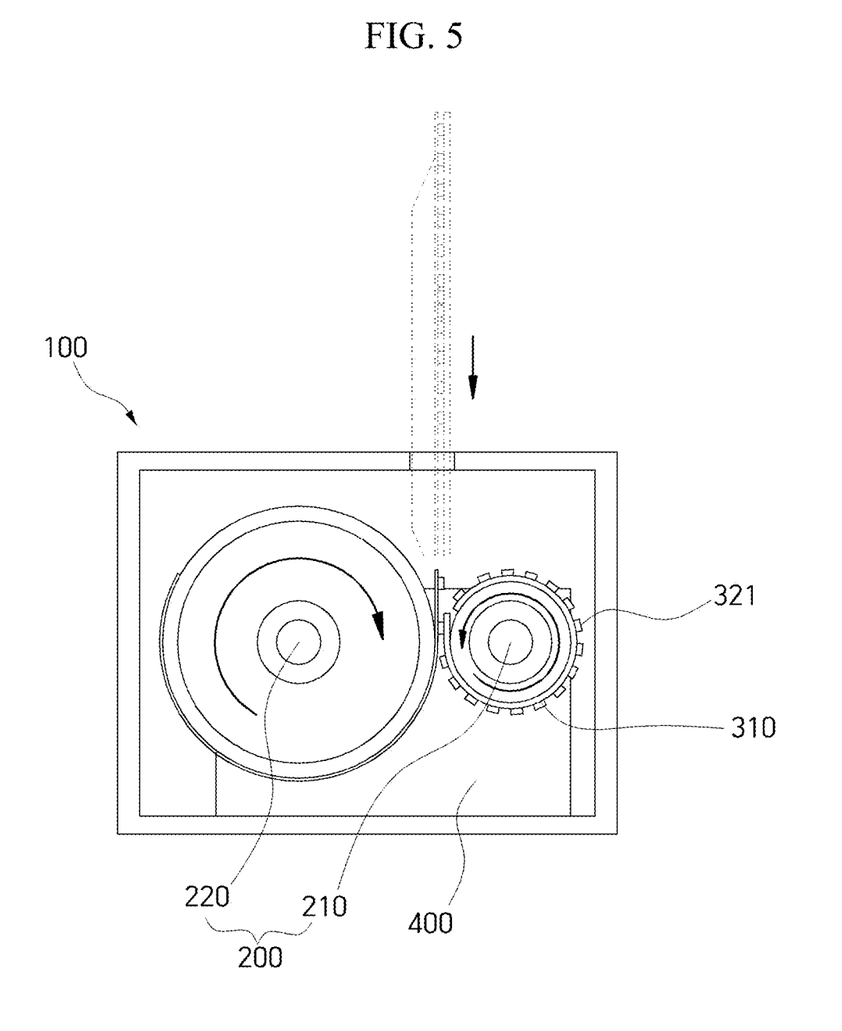
FIG. 5 is a cross-sectional view illustrating that the rollable display device for a vehicle in accordance with the embodiment of the present disclosure is wound.

FIG. 1 is a perspective view illustrating a rollable display device for a vehicle in accordance with an embodiment of the present disclosure, when seen from one direction, FIG. 2 is a perspective view illustrating the embodiment of the rollable display device for a vehicle in accordance with the present disclosure, when seen from another direction, FIG. 3 is a cross-sectional view taken along line A-A' of FIG. 1, FIG. 4 is a plan view illustrating the rollable display device for a vehicle in accordance with the embodiment of the present disclosure, and FIG. 5 is a cross-sectional view illustrating that the rollable display device for a vehicle in accordance with the embodiment of the present disclosure is wound.

Referring to FIGS. 1 to 5, a rollable display device for a vehicle in accordance with an embodiment of the present disclosure includes a housing 100, a display panel 300, a roller part 200, and a driving part 400.

The housing 100 forms the body of the rollable display device for a vehicle, and has a housing space formed therein to house various components such as the display panel 300, the roller part 200, and the driving part 400 in accordance with the present disclosure.

Desirably, the housing 100 is formed as a rectangular frame having a large width in the side-to-side direction of the vehicle.

In particular, the display panel 300 among the various components housed in the housing space of the housing 100 is selectively unrolled from the housing 100 or rolled into the housing 100.

For this structure, the housing 100 has a through-hole 110 formed at the top surface thereof, such that the display panel 300 is unrolled from the housing 100 or rolled into the housing 100 through the through-hole 110.

Desirably, the through-hole 110 is formed as a long hole elongated in the side-to-side direction of the vehicle at the top surface of the housing 100.

Through the through-hole 110, the display panel 300 among the various components housed in the housing space of the housing 100 is unrolled from the housing 100 or rolled into the housing 100.

That is, the display panel 300 housed in the housing space of the housing 100 may be easily unrolled from the housing 100 or easily rolled into the housing 100 through the through-hole 110.

The roller part 200 is housed in the housing space of the housing 100, and has one end and the other end which are rotatably coupled to one surface and the other surface of the housing space of the housing 100 in the widthwise direction thereof, respectively.

Such a roller part 200 includes a display roller 210 and a support roller 220.

The display roller 210 is disposed in a lower region of the housing space, and spaced by a predetermined distance apart from the bottom surface of the housing 100.

The bottom of a screen part 310 of the display panel 300 is coupled in a belt shape to the circumference of the display roller 210 in the widthwise direction.

The display roller 210 is electrically coupled to the driving part 400, and rotated in a preset direction when power is applied from the driving part 400.

That is, the display roller 210 winds or unwinds the screen part 310 of the display panel 300 according to the rotation direction of the display roller 210 in the housing 100.

The support roller 220 is disposed at a position spaced by a predetermined distance apart from the display roller 210 in a horizontal direction at the lower region of the housing space.

Furthermore, the bottom of a vertical support 322 constituting a support part 320 of the display panel 300 is coupled in a belt shape to the circumference of the support roller 220 in the widthwise direction.

Furthermore, the support roller 220 is electrically coupled to the driving part 400, and rotated in a preset direction when power is applied from the driving part 400.

That is, the support roller 220 winds or unwinds the vertical support 322 constituting the support part 320 of the display panel 300 according to the rotation direction of the support roller 220 in the housing 100.

The display roller 210 has a smaller outer diameter than that of the support roller 220, and the display roller 210 and the support roller 220 are spaced by the thickness of the display panel 300 apart from each other.

The display roller 210 and the support roller 220 are rotated in the opposite directions to each other.

For example, when the display roller 210 is rotated in the clockwise direction, the support roller 220 is rotated in the counterclockwise direction, and when the display roller 210 is rotated in the counterclockwise direction, the support roller 220 is rotated in the clockwise direction.

Thus, when the roller part 200 winds the display panel 300, the screen part 310 of the display panel 300 and a horizontal support 321 constituting the support part 320 of the display panel 300 may be easily wound around the display roller 210, and the vertical support 322 constituting the support part 320 of the display panel 300 may be easily wound around the support roller 220.

In particular, as the display roller 210 and the support roller 220 are spaced by the thickness of the display panel 300 apart from each other, the horizontal support 321 and the vertical support 322 which constitute the support part 320 may reliably come into surface contact with each other.

Such a support roller 220 includes a body part 221 and a protrusion part 222.

The body part 221 is formed in a cylindrical shape, and has the same length as the display roller 210.

The protrusion part 222 is formed in a belt shape wound around the circumference of the body part 221, and provided as a plurality of protrusion parts which are spaced apart from each other in the longitudinal direction of the body part 221.

The protrusion part 222 has a width smaller than the distance between a pair of protrusion parts 222 adjacent to each other among the plurality of protrusion parts 222.

The display panel 300 is housed in the housing space of the housing 100, and unrolled from the housing 100 or rolled into the housing 100 according to a user's selection.

When the display panel 300 is rolled into the housing space of the housing 100, the display panel 300 is wounded around the roller part 200 housed in the housing space of the housing 100.

On the contrary, when the display panel 300 is unrolled from the housing space of the housing 100, the display panel 300 is unwounded from the roller part 200 housed in the housing space of the housing 100.

Such a display panel 300 includes the screen part 310 and the support part 320.

The screen part 310 is an output unit configured to display AV system-related information to a driver such that the driver can easily and visually recognize necessary information. The screen part 310 receives an output signal from the outside, and outputs various pieces of information.

The screen part 310 is implemented as a capacitive touch panel using ITO (Indium Tin Oxide).

That is, a driver or passenger touches the screen part 310, in order to adjust the volume of the AV system such as an audio or CD player mounted on the center fascia inside the vehicle, control power on/off or frequency tuning, and control an air conditioning or heating function of an air conditioning system such that the vehicle can travel in a comfortable state.

Although it has been described that the screen part 310 is implemented as a capacitive touch panel using ITO, various other materials may be used for the screen part 310 as long as the screen part 310 can be bent like paper while having a touch function.

The bottom of the screen part 310, at which the display roller 210 is disposed, is coupled in a belt shape to the circumference of the display roller 210 in the widthwise direction.

Thus, the screen part 310 may be wound around or unwound from the display roller 210 according to the rotation direction of the display roller 210.

For this operation, an OLED (Organic Light Emitting Diode) which can maintain display performance even though the OLED is bent like paper is used as the screen part 310 in accordance with the present disclosure.

The OLED is a self-emissive device, and requires no back lights used in an LCD (Liquid Crystal Display) as a non-emissive device. Thus, the display panel 300 may be formed with a low weight and a small thickness.

In particular, the OLED used as the screen part 310 is bent like paper and thus may be easily wound around or unwound from the roller part 200.

The support part 320 is disposed on the rear side of the screen part 310 in the direction of an engine room. When a driver or passenger presses the screen part 310 to touch the screen part 310, the support part 320 prevents the screen part 310 from being pushed in the direction that the screen part 310 is pressed.

Specifically, when the driver or passenger touches the screen part 310 with the display panel 300 unrolled from the housing space of the housing 100 through the through-hole 110 of the housing 100, the support part 320 supports the screen part 310 which is pressed in the touch direction.

Such a support part 320 includes the horizontal support 321 and the vertical support 322.

The horizontal support 321 is desirably made of high-strength stainless steel (SUS), provided as a plurality of horizontal supports 321, and coupled to the rear surface of the screen part 310.

Specifically, the plurality of horizontal supports 321 are spaced apart from each other on the rear surface of the screen part 310 in a vertical direction from top to bottom.

That is, when the screen part 310 is wound around the display roller 210, the horizontal supports 321 coupled to the rear surface of the screen part 310 are wound together with the screen part 310.

The horizontal support 321 has a length smaller than or equal to the width of the screen part 310.

Thus, when the driver or passenger touches the screen part 310 with the screen part 310 unwound from the display roller 210 so as to appear from the housing space of the housing 100, the horizontal support 321 may effectively prevent a portion of the entire region of the screen part 310, which is touched by the driver or passenger's finger, from being depressed.

The vertical support 322 is made of high-elasticity stainless steel (SUS), and disposed on the rear surfaces of the horizontal supports 321.

When the driver or passenger touches the screen part 310 with the screen part 310 unwound from the display roller 210 so as to appear from the housing space of the housing 100, the vertical support 322 prevents the screen part 310 from being pushed in the direction that the driver or passenger presses the screen part 310 with his/her finger.

Such a vertical support 322 includes a support body part 323, a wing part 324, and an inclined part 325.

The support body part 323 forms the body of the vertical support 322, and is disposed on the rear surfaces of the horizontal supports 321.

The bottom of the support body part 323, at which the support roller 220 is disposed, is coupled in a belt shape to the circumference of the support roller 220 in the widthwise direction.

Thus, the support body part 323 may be wound around or unwound from the support roller 220 according to the rotation direction of the support roller 220.

The support body part 323 has an area equal to or smaller than the screen part 310.

Therefore, when the display panel 300 is unrolled from the housing 100 such that the driver or passenger watches the display device for a vehicle inside the vehicle, the support body part 323 is covered by the screen part 310 and prevented from being exposed to the outside.

The wing part 324 is provided as a plurality of wing parts which are spaced by a predetermined distance apart from each other in the horizontal direction on the support body part 323.

As the wing part 324 is made of high-elasticity stainless steel (SUS), the wing part 324 is elastically bent from the support body part 323 toward the support roller 220.

That is, when the wing part 324 is unwound from the support roller 220 such that the display panel 300 appears from the housing 100, the wing part 324 is bent from the support body part 323 toward the support roller 220.

Therefore, the wing part 324 supports the screen part 310 in the vertical direction.

Thus, when the driver or passenger touches the screen part 310 with the screen part 310 unwound from the display roller 210 so as to appear from the housing space of the housing 100, the wing part 324 prevents the screen part 310 from being pushed in the direction that the driver or passenger presses the screen part 310 with his/her finger.

Furthermore, the wing part 324 may support the screen part 310 in the vertical direction, thereby effectively preventing the screen part 310 from being bent by vibration generated during driving of the vehicle due to the characteristics of the use environment.

In a plan view, the wing part 324 has a shape inclined toward a cut groove 326 which is formed in the support body part 323 by cutting the wing part 324.

Thus, when the support roller 220 presses the wing part 324 while rotated along the inclined surface, the wing part 324 may be spread toward the cut groove 326 by the support roller 220.

The plurality of wing parts 324 arranged on the left side of the middle region of the support body part 323 and the plurality of wing parts 324 arranged on the right side of the middle region of the support body part 323 are inclined in directions facing each other.

Therefore, when the vertical support 322 is wound around the support roller 220, the wing parts 324 disposed at both edges of the support body part 323, among the plurality of wing parts 324, may be prevented from protruding from the left and right side surfaces of the support body part 323.

The inclined parts 325 are formed at one end and the other end of the wing part 324, such that the inclined part 325 disposed at the support roller 220 is inclined toward the support roller 220.

When the support body part 323 is wound around the support roller 220, the wing part 324 may be pressed by the support roller 220 and easily spread toward the cut groove 326.

Specifically, while the vertical support 322 is wound around the support roller 220, the support roller 220 presses the inclined part 325.

The surface of the vertical support 322, on which the display roller 210 is disposed, is pressed by the screen part 310 and the horizontal support 321.

Therefore, the surface of the vertical support 322, on which the display roller 210 is disposed, and the surface of the vertical support 322, on which the support roller 220 is disposed, may be pressed by each other, such that the wing part 324 is easily spread toward the cut groove 326 formed in the support body part 323.

In particular, as the wing part 324 is wound while the support roller 220 presses the wing part 324 along the inclined part 325, the wing part 324 may be well spread on the support roller 220.

Thus, the vertical support 321 may be easily wound around the support roller 220.

The driving part 400 is housed in the housing 100, and the roller part 200 is coupled to the driving part 400.

Such a driving part 400 may be provided as a pair of driving parts 400 which are coupled to the display roller 210 and the support roller 220, respectively.

Therefore, the pair of driving parts 400 may rotate the display roller 210 and the support roller 220, respectively, such that the display roller 210 can wind or unwind the screen part 310 and the vertical support 321, and the support roller 220 can wind or unwind the vertical support 322.

In the above-described rollable display device for a vehicle in accordance with the present disclosure, the plurality of support parts 320 may be coupled to the rear surface of the screen part 310 so as to be spaced by the predetermined distance apart from each other in the upward and downward directions. Thus, when a driver or passenger touches the screen part 310 with the screen part 310 unwound from the display roller 210 so as to appear from the housing space of the housing 100, the support parts 320 may effectively prevent a portion of the entire region of the screen part 310, which is touched by the driver or passenger's finger, from being depressed.

Furthermore, the wing parts 324 may support the screen part 310 in the vertical direction. Thus, when the driver or passenger touches the screen part 310 with the screen part 310 unwound from the display roller 210 so as to appear from the housing space of the housing 100, the wing parts 324 may prevent the screen part 310 from being pushed in the direction that the driver or passenger presses the screen part 310 with his/her finger.

Furthermore, the wing parts 324 may effectively prevent the screen part 310 from being bent by vibration generated during driving of the vehicle due to the characteristics of the use environment.

While various embodiments have been described above, it will be understood to those skilled in the art that the embodiments described are by way of example only. Accordingly, the disclosure described herein should not be limited based on the described embodiments.

What is claimed is:

1. A rollable display device for a vehicle, comprising:
   a housing forming a body of the rollable display device and having a housing space formed therein;
   a roller part rotatably housed in the housing space; and
   a display panel wound around the roller part or unwound from the roller part according to a rotation direction of the roller part,
   wherein the display panel comprises:
      a screen part configured to receive an output signal from outside the display device and output information; and
      a support part disposed on a rear surface of the screen part and being configured to support the screen part in a horizontal direction and a vertical direction; and
   wherein the roller part comprises:
      a display roller disposed in a lower region of the housing space and being configured to wind or unwind the screen part and a plurality of horizontal supports of the support part according to a rotation direction thereof; and
      a support roller disposed in the lower region of the housing space spaced apart from the display roller by a predetermined distance and being configured to wind or unwind a vertical support of the support part according to a rotation direction thereof.

2. The rollable display device of claim 1, wherein the display roller and the support roller are rotated in opposite directions.

3. The rollable display device of claim 1, wherein the display roller and the support roller are spaced apart from each other by a thickness of the display panel.

4. The rollable display device of claim 1, wherein the display roller has an outer diameter smaller than an outer diameter of the support roller.

5. The rollable display device of claim 1, wherein the support roller comprises:
   a body part forming a body of the support roller; and
   a plurality of protrusion parts formed along a circumference of the body part and being spaced apart from each other by a predetermined distance in a longitudinal direction of the body part.

6. The rollable display device of claim 5, wherein a width of each of the protrusion parts in the longitudinal direction of the body part is smaller than a distance between the pair of protrusion parts adjacent each other.

7. A rollable display device for a vehicle, comprising:
   a housing forming a body of the rollable display device and having a housing space formed therein;
   a roller part rotatably housed in the housing space;
   a display panel comprising a screen part configured to receive an output signal from outside the display device and output information, and a support part disposed on a rear surface of the screen part and being configured to support the screen part in a horizontal direction and a vertical direction, wherein the display panel is wound around the roller part or unwound from the roller part according to a rotation direction of the roller part; and
   a driving part configured to rotate the roller part,
   wherein the roller part comprises:
      a display roller disposed in a lower region of the housing space and being configured to wind or unwind the screen part and a plurality of horizontal supports of the support part according to a rotation direction thereof; and
      a support roller disposed in the lower region of the housing space spaced apart from the display roller by a predetermined distance and being configured to wind or unwind a vertical support of the support part according to a rotation direction thereof.

8. The rollable display device of claim 7, wherein the support part comprises:
   the plurality of horizontal supports disposed on a rear surface of the screen part and spaced apart from each other in a top-to-bottom direction by a predetermined distance; and
   the vertical support disposed on a rear surface of the horizontal support.

9. The rollable display device of claim 7, wherein when the display panel is unrolled from the housing, the horizontal support and the vertical support come into contact with each other.

10. The rollable display device of claim 7, wherein the horizontal support has a length smaller than or equal to a width of the screen part.

11. The rollable display device of claim 7, wherein the vertical support comprises:
    a plate-shaped support body part disposed on the rear surface of the horizontal support;
    a plurality of wing parts cut from the support body part and configured to be elastically bent from the support body part; and
    an inclined part formed at each of one end and another end of each of the wing parts.

12. The rollable display device of claim 11, wherein each wing part is bent from the support body part toward the support roller.

13. The rollable display device of claim 11, wherein, when seen from a top view, each wing part is inclined toward a cut groove formed by cutting the wing part from the support body part.

14. The rollable display device of claim 11, wherein a first plurality of wing parts of the plurality of wing parts are arranged on a left side of a middle region of the support body part and a second plurality of wing parts of the plurality of wing parts are arranged on a right side of the middle region of the support body part, and the first and second plurality of wing parts are inclined in directions facing each other.

* * * * *